United States Patent
Warner

(10) Patent No.: US 9,424,322 B2
(45) Date of Patent: Aug. 23, 2016

(54) DIGITAL STICKY NOTE

(71) Applicant: SONY CORPORATION, Tokyo (JP)

(72) Inventor: Jason Michael Warner, San Diego, CA (US)

(73) Assignee: Sony Corporation, Tokyo (JP)

( * ) Notice: Subject to any disclaimer, the term of this patent is extended or adjusted under 35 U.S.C. 154(b) by 295 days.

(21) Appl. No.: 14/089,433

(22) Filed: Nov. 25, 2013

(65) Prior Publication Data

US 2015/0149452 A1    May 28, 2015

(51) Int. Cl.
*G06F 7/00*     (2006.01)
*G06F 17/30*    (2006.01)

(52) U.S. Cl.
CPC .... *G06F 17/30554* (2013.01); *G06F 17/30156* (2013.01); *G06F 17/30867* (2013.01)

(58) Field of Classification Search
None
See application file for complete search history.

(56) References Cited

U.S. PATENT DOCUMENTS

| | | |
|---|---|---|
| 7,333,890 B2 | 2/2008 | Zhu |
| 7,340,691 B2 | 3/2008 | Bassett et al. |
| 7,562,043 B2 | 7/2009 | Brown et al. |
| 7,711,578 B2 * | 5/2010 | Williams ............... G06Q 10/10 705/2 |
| 7,725,480 B2 | 5/2010 | Bassett et al. |
| 7,744,297 B2 | 6/2010 | Nakajima |
| 7,797,078 B2 | 9/2010 | Sakano |
| 7,904,827 B2 | 3/2011 | Taniguchi et al. |
| 7,937,860 B2 | 5/2011 | Wightman |
| 8,125,676 B2 | 2/2012 | Takada |
| 8,196,964 B2 | 6/2012 | Kuo et al. |
| 8,280,984 B2 | 10/2012 | Lance et al. |
| 8,395,805 B2 | 3/2013 | Sato |
| 8,407,075 B2 | 3/2013 | Lance et al. |
| 2002/0196280 A1 | 12/2002 | Bassett et al. |
| 2003/0004856 A1 | 1/2003 | Brown et al. |
| 2003/0069786 A1 | 4/2003 | Hoffman et al. |
| 2006/0224323 A1 | 10/2006 | Zhu |
| 2007/0174104 A1 | 7/2007 | O'Sullivan et al. |
| 2007/0183831 A1 | 8/2007 | Nakajima |
| 2007/0285721 A1 | 12/2007 | Sato |
| 2007/0294304 A1 | 12/2007 | Bassett et al. |

(Continued)

FOREIGN PATENT DOCUMENTS

WO     2012128555     9/2012

OTHER PUBLICATIONS

Sudhakar Reddy M., "A Method and System for Displaying Advertisements based on User Related Events", Yahoo! Inc., http://ip.com/IPCOM/000209871, Aug. 18, 2011.

*Primary Examiner* — Tuan A Pham
(74) *Attorney, Agent, or Firm* — John L. Rogitz; John M. Rogitz

(57) ABSTRACT

An apparatus includes at least one computer readable storage medium that bears instructions executable by a processor to configure the processor for accessing one or more electronically stored calendars of events pertaining to at least one user to obtain first calendar information from the one or more electronically stored calendars. The instructions also configure the processor for accessing at least one social network service for which the user has an account to obtain second calendar information from the site, consolidating the first and second calendar information to render consolidated information, presenting at least some of the consolidated information on a user device associated with the user, and presenting a recommendation for action pertaining to the event along with at least one event in die consolidated information.

17 Claims, 4 Drawing Sheets

(56) References Cited

U.S. PATENT DOCUMENTS

| | | |
|---|---|---|
| 2008/0018042 A1 | 1/2008 | Sakano |
| 2008/0046471 A1 | 2/2008 | Moore et al. |
| 2008/0047971 A1 | 2/2008 | Sakano et al. |
| 2008/0052162 A1 | 2/2008 | Wood |
| 2008/0128075 A1 | 6/2008 | Ho |
| 2008/0136833 A1 | 6/2008 | Taniguchi et al. |
| 2008/0225319 A1 | 9/2008 | Takada |
| 2009/0019107 A1 | 1/2009 | Lance et al. |
| 2009/0117305 A1 | 5/2009 | Sakano |
| 2009/0157693 A1* | 6/2009 | Palahnuk .............. G06Q 30/00 |
| 2009/0158173 A1 | 6/2009 | Palahnuk et al. |
| 2009/0208686 A1 | 8/2009 | Ho |
| 2009/0210351 A1* | 8/2009 | Bush .................. G06Q 50/188 705/80 |
| 2009/0259674 A1 | 10/2009 | Griffin et al. |
| 2009/0307044 A1 | 12/2009 | Chakra et al. |
| 2010/0018089 A1 | 1/2010 | Wightman |
| 2011/0071878 A1 | 3/2011 | Gingras et al. |
| 2011/0115825 A1 | 5/2011 | Tetsuhashi |
| 2011/0156381 A1 | 6/2011 | Kuo et al. |
| 2011/0225178 A1* | 9/2011 | Ingrassia ........... G06F 17/30038 707/769 |
| 2011/0271206 A1* | 11/2011 | Jones .................... G06F 3/0488 715/753 |
| 2011/0285733 A1 | 11/2011 | Chuang et al. |
| 2011/0317523 A1* | 12/2011 | Lance .................. G06Q 10/109 368/10 |
| 2012/0114891 A1 | 5/2012 | Smith |
| 2012/0271676 A1 | 10/2012 | Aravamudan et al. |
| 2012/0297312 A1 | 11/2012 | Lance et al. |
| 2012/0315420 A1 | 12/2012 | Kuo et al. |
| 2012/0315421 A1 | 12/2012 | Kuo et al. |
| 2013/0085705 A1* | 4/2013 | Jano .................... H04M 1/0208 702/127 |
| 2013/0212028 A1* | 8/2013 | Delhaes ................ G06Q 30/02 705/301 |
| 2013/0218888 A1 | 8/2013 | Seligmann |
| 2013/0276058 A1 | 10/2013 | Buldas et al. |

* cited by examiner

DIGITAL STICKY NOTE

I. FIELD OF THE INVENTION

The present application relates generally to presenting aggregated information on a consumer electronics (CE) device.

II. BACKGROUND OF THE INVENTION

In today's digital world, consumer electronics (CE) device users often have many online accounts and electronic storage areas for which information specific to the user is stored. Thus, it is often the case that the user when seeking stored information has to browse many sources of information, accounts, and/or applications each associated with the user but stored in a different location and/or presented in different ways, which can be laborious, time consuming, and burdensome.

SUMMARY OF THE INVENTION

Accordingly, present principles recognize that systems, devices, and methods as disclosed herein may provide a way to aggregate user information from plural sources and provide the information to a user in an consolidated, organized manner.

Thus, in a first aspect an apparatus includes at least one computer readable storage medium that is not a carrier wave and that bears instructions executable by a processor to configure the processor for accessing one or more electronically stored calendars of events pertaining to at least one user to obtain first calendar information from the one or more electronically stored calendars. The instructions also configure the processor for accessing at least one social networking service for which the user has an account to obtain second calendar information from the site, consolidating the first and second calendar information to render consolidated information, presenting at least some of the consolidated information on a user device associated with the user, and presenting a recommendation for action pertaining to the event along with at least one event in the consolidated information.

In some embodiments, the instructions when executed by the processor may further configure the processor for facilitating the user viewing the at least some of the consolidated information on the user device by week or month at the user's option. Also in some embodiments, the instructions when executed by the processor may further configure the processor for accessing a user profile to present the recommendation, and/or accessing at least one email account of the user to obtain third calendar information from the site and consolidating the third calendar information with the first and second calendar information to render the consolidated information. The consolidated information may be arranged chronologically or reverse-chronologically.

Further still, the instructions when executed by the processor may configure the processor for accessing personal information associated with a subject of the event and, based on the personal information, rendering the recommendation. Also if desired, a restaurant may be automatically recommended responsive to a determination that the event is a dinner and attendees associated with the event other than the user are located near the restaurant.

In still another aspect, a method includes automatically gathering calendar information of a user from plural sources of calendar information, and automatically presenting a recommendation pertaining to at least one event in the calendar information based at least in part on a person's profile.

In still another aspect, a computer system may include a processor and a computer readable medium accessible to the processor and bearing instructions executable by the processor for accessing calendar information of a user, accessing profile information of at least one person associated with the calendar information, and based at least in part on the profile information, outputting at least one recommendation pertaining to at least one event in the calendar information.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
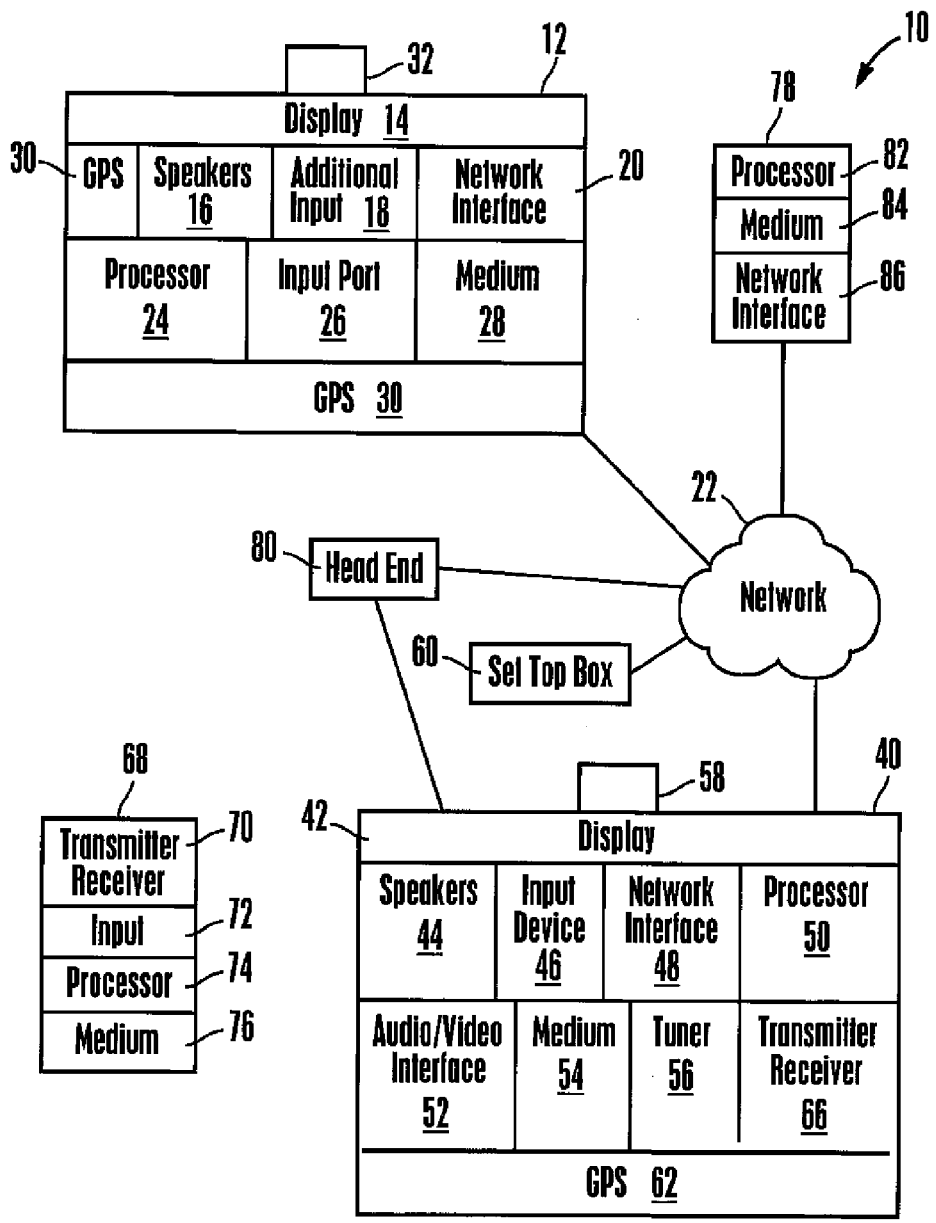
FIG. 1 is a block diagram of an example system including two example CE devices in accordance with present principles.

This disclosure relates generally to consumer electronics (CE) device based user information. With respect to any computer systems discussed herein, a system herein may include server and/or head end, and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may employ, as non-limiting examples, operating systems from Apple, Google, or Microsoft. A Unix operating system may be used. These operating systems can execute one or more browsers such as a browser made by Microsoft or Google or Mozilla or other browser program that can access web applications hosted by the Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software modules described by way of flow charts and/or user interfaces herein can include various sub-routines, procedures, etc. It is to be understood that logic divulged as being executed by a module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

In an example, a processor can access information over its input lines from data storage, such as the computer readable storage medium, and/or the processor accesses information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the CE device.

Components included in one embodiment can be used in other embodiments in any appropriate combination. For example, any of the various components described herein and/or depicted in the FIGS. may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Before describing FIG. 1, it is to be understood that the CE devices and software described herein are understood to be usable in the context of a digital ecosystem. Thus, as understood herein, a computer ecosystem, or digital ecosystem, may be an adaptive and distributed socio-technical system that is characterized by its sustainability, self-organization, and scalability. Inspired by environmental ecosystems, which consist of biotic and abiotic components that interact through nutrient cycles and energy flows, complete computer ecosystems consist of hardware, software, and services that in some cases may be provided by one company, such as Sony Electronics. The goal of each computer ecosystem is to provide consumers with everything that may be desired, at least in part services and/or software that may be exchanged via the Internet. Moreover, interconnectedness and sharing among elements of an ecosystem, such as applications within a computing cloud, provides consumers with increased capability to organize and access data and presents itself as the future characteristic of efficient integrative ecosystems.

Two general types of computer ecosystems exist: vertical and horizontal computer ecosystems. In the vertical approach, virtually all aspects of the ecosystem are associated with the same company (e.g. produced by the same manufacturer), and are specifically designed to seamlessly interact with one another. Horizontal ecosystems, one the other hand, integrate aspects such as hardware and software that are created by differing entities into one unified ecosystem. The horizontal approach allows for greater variety of input from consumers and manufactures, increasing the capacity for novel innovations and adaptations to changing demands. But regardless, it is to be understood that some digital ecosystems, including those referenced herein, may embody characteristics of both the horizontal and vertical ecosystems described above.

Now specifically referring to FIG. 1, an example system 10 is shown, which may include one or more of the example devices disclosed herein and described further below to present information such as e.g. consolidated calendar and event information in accordance with present principles. The first of the example devices included in the system 10 is an example consumer electronics (CE) device 12. The CE device 12 may be, e.g., a computerized Internet enabled ("smart") telephone, a tablet computer, a notebook computer, a wearable computerized device such as e.g. computerized Internet-enabled watch, a computerized Internet-enabled music player, and even e.g. a computerized Internet-enabled television (TV). Regardless, it is to be understood that the CE device 12 is configured to undertake present principles (e.g. to access calendar information, event information, activity information, etc. from plural sources, to communicate with other CE devices to undertake present principles, to execute the logic described herein, and perform any other functions and/or operations described herein).

Accordingly, to undertake such principles the CE device 12 may include some or all of the components shown in FIG. 1. For example, the CE device 12 can include one or more touch-enabled displays 14 (e.g. configured to receive input such touch-input from a user, present images thereon including the user interfaces (UIs) described below, etc.), one or more speakers 16 for outputting audio, and at least one additional input device 18 such as e.g. an audio receiver/microphone for e.g. entering audible commands to the CE device 12 to control the CE device 12. The example CE device 12 may also include one or more network interfaces 20 for communication over at least one network 22 such as the Internet, an WAN, an LAN, etc. under control of one or more processors 24. It is to be understood that the processor 24 controls the CE device 12 to undertake present principles, including the other elements of the CE device 12 described herein such as e.g. controlling the display 14 to present images/content thereon and receiving input therefrom. Furthermore, note the network interface 20 may be, e.g., a wired or wireless modem or router, or other appropriate interface such as, e.g., a wireless telephony transceiver, Wi-Fi transceiver, etc.

In addition to the foregoing, the CE device 12 may also include one or more input ports 26 such as, e.g., a USB port to physically connect (e.g. using a wired connection) to another CE device. The CE device 12 may further include one or more tangible computer readable storage mediums 28 such as disk-based or solid state storage, it being understood that the computer readable storage medium 28 may not be a carrier wave. Also in some embodiments, the CE device 12 can include a position or location receiver such as but not limited to a GPS receiver 30 that is configured to e.g. receive geographic position information from at least one satellite and provide the information to the processor 24. However, it is to be understood that another suitable position receiver other than a GPS receiver may be used in accordance with present principles to e.g. determine the location of the CE device 12.

Continuing the description of the CE device 12, in some embodiments the CE device 12 may include one or more cameras 32 that may be, e.g., a thermal imaging camera, a digital camera such as a webcam, and/or a camera integrated into the CE device 12 and controllable by the processor 24 to gather pictures/images and/or video in accordance with present principles (e.g. to gather an image of a user of the CE device for facial recognition purposes).

Still referring to FIG. 1, in addition to the CE device 12, the system 10 may further include one or more other CE devices such as a CE device 40 that in exemplary embodiments may be a television (TV) such as e.g. a high definition TV and/or Internet-enabled computerized TV (e.g. a "smart" TV). It is to thus be understood that the CE device 40 is also configured to undertake present principles.

Describing the CE device 40 with more specificity, it includes one or more touch-enabled displays 42, one or more speakers 44 for outputting audio in accordance with present principles, and at least one additional input device 46 such as e.g. an audio receiver/microphone for e.g. entering audible commands to the CE device 40 to control the CE device 40. The CE device 40 may also include one or more network interfaces 48 for communication the network 22 under control of one or more processors 50. It is to be understood that the processor 50 controls the CE device 40 to undertake present principles, including the other elements of the CE device 40 described herein such as e.g. controlling the display 42 to present images/content thereon and receiving input. Furthermore, note the network interface 48 may be, e.g., a wired or wireless modem or router, or other appropriate interface such as, e.g., a wireless telephony transceiver, Wi-Fi transceiver, etc.

In addition to the foregoing, the CE device 40 may also include e.g. an audio video (AV) interface 52 such as, e.g., a USB or HDMI port for receiving input (e.g. AV content) from a component device such as e.g. a set top box 60 or Blue Ray disc player for presentation of the content on the CE device 40, as well as a tuner 56 also configured for receiving input. The CE device 12 may further include one or more tangible computer readable storage mediums 54 such as disk-based or solid state storage, it being understood that the computer readable storage medium 54 may not be a carrier wave. Also in some embodiments, the CE device 40 can include a position or location receiver such as but not limited to a GPS receiver 62 that is configured to e.g. receive geographic position information from at least one satellite and provide the information to the processor 50. However, it is to be understood that another suitable position receiver other than a GPS receiver may be used in accordance with present principles to e.g. determine the location of the CE device 40.

Continuing the description of the CE device 40, in some embodiments the CE device 40 may include one or more cameras 58 that may be, e.g., a thermal imaging camera, a digital camera such as a webcam, and/or a camera integrated into the CE device 40 and controllable by the processor 50 to gather pictures/images and/or video in accordance with present principles (e.g. to gather an image of a user of the CE device for facial recognition purposes). In addition to the foregoing, the CE device 40 may also include a transmitter/receiver 66 for communicating with a remote commander (RC) 68 associated with the CE device 40 and configured to provide input (e.g., commands) to the CE device 40 (e.g. to the processor 50) to thus control the CE device 40, and to also provide input to the set top box 60 to control it as well. Accordingly, the RC 68 also has a transmitter/receiver 70 for communicating with the CE device 40 through the transmitter/receiver 66, and/or for communicating with the set top box 60 through a respective transmitter (not shown) associated with the set top box 60. The RC 68 also includes an input device 72 such as a keypad or touch screen display, as well as a processor 74 for controlling the RC 68 and a tangible computer readable storage medium 76 such as disk-based or solid state storage. Though not shown, in some embodiments the RC 68 may also include a touch-enabled display screen and a microphone that may be used for providing input/commands to the CE device 40 in accordance with present principles.

Still describing FIG. 1, it also shows at least one server 78 configured for communication with the CE devices 12, 40, and also a head end 80 to be described shortly. The server 78 includes at least one processor 82, at least one tangible computer readable storage medium 84 that may not be a carrier wave such as disk-based or solid state storage, and at least one network interface 86 that, under control of the processor 82, allows for communication with the CE devices of FIG. 1 over the network 22, and indeed may facilitate communication therebetween in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 78 may be an Internet server, and may store and/or provide information and data to one of the CE devices 12, 40 in accordance with present principles. Note that in example embodiments the server 78 may include and perform "cloud" functions such that the CE devices 12, 40 of the system 10 may access a "cloud" environment (e.g., where the user's AV content, calendar(s), email account information, etc. may be stored) via the server 78 to e.g. access calendar information stored thereat, stream music for which to listen and/or stream or download audio video (AV) content to the CE device.

Now in reference to the afore-mentioned head end 80, it is to be understood that in example embodiments the head end 80 may be e.g. a cable head end and/or a satellite head end. The head end 80 is understood to be in communication with the CE device 40, and/or even the CE device 12 and server 78 over, e.g., a closed network (through a wired or wireless connection), and furthermore may itself include a network interface (not shown) such that the head end 80 may communicate with the CE devices 12, 40 and/or server 78 over a wide-area and/or open network such as the network 22. Further still, it is to be understood that the head end 80 may be wired or wirelessly connected to a non-internet server, and/or may optionally be integrated with a non-internet server or the server 78. In any case, it is to be understood that the head end 80 may facilitate the transmission of information and AV content to the CE device 40 through e.g. the set top box 60 in accordance with present principles. It is to be understood that the set top box 60 may e.g. locally store (on a computer readable storage medium not shown) a channel and/or program history of AV content that has been selected at the set top box 60 for presentation on the CE device 40 under control of a set top box processor (also not shown). Notwithstanding, it is to be understood that e.g. the sever 78 and head end 80 may also store channel and/or program history information to provide it to a CE device consolidating such information with other information in accordance with present principles.

It is to be understood that other CE devices described herein may each respectively include some or all of the various components described above in reference to the CE devices 12, 40 even if not specifically shown or described.

Figure 2:
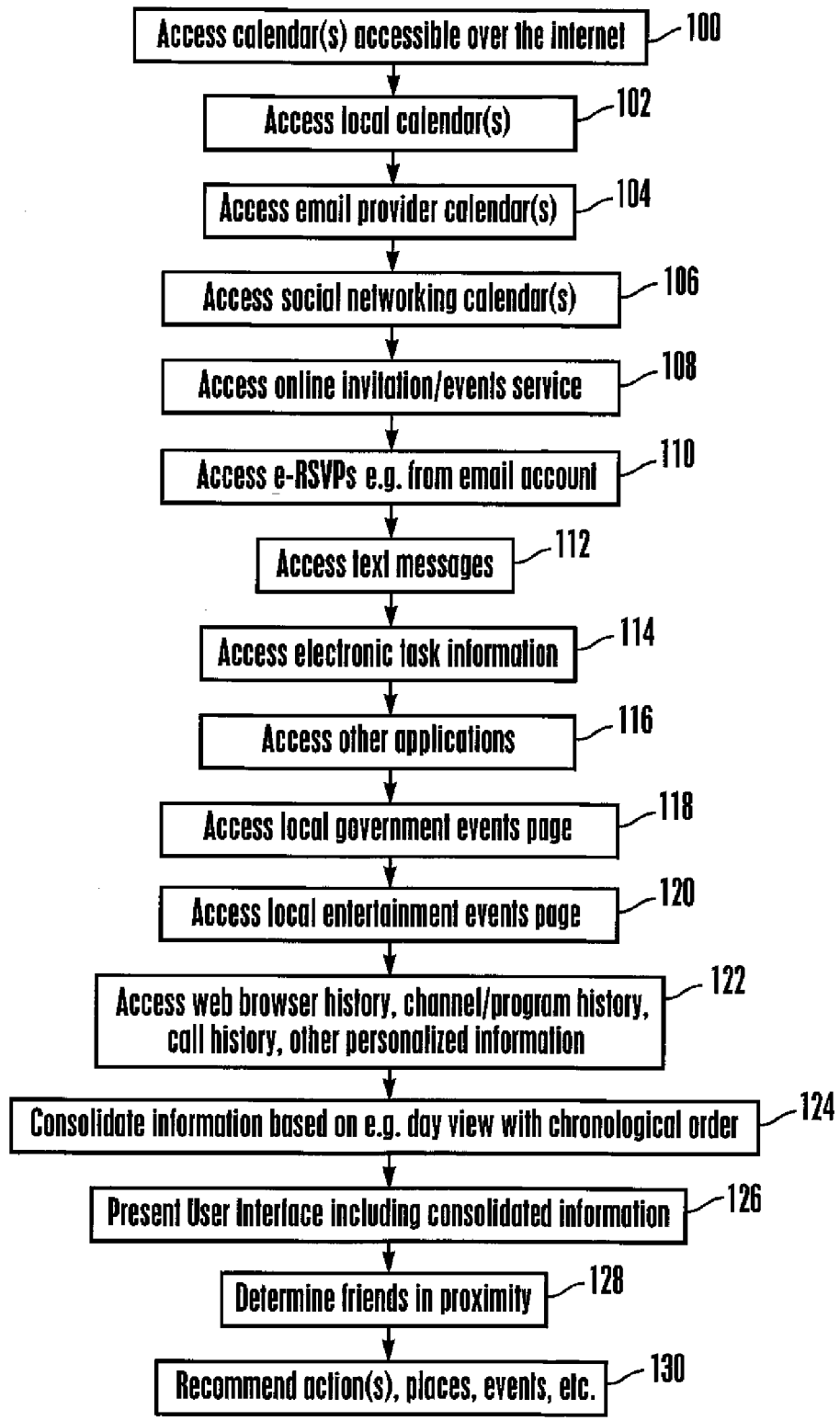
FIG. 2 is an exemplary flowchart of logic to be executed by a CE device in accordance with present principles.

Turning now to FIG. 2, an example flowchart of logic is shown that may be executed by a CE device such as those described above. Beginning at block 100, the logic accesses calendar information for one or more people including e.g. the user of the CE device undertaking the logic of FIG. 2. It is to be understood that the calendar information accessed at block 100 is accessible over the Internet and may be e.g. an electronic calendar stored in cloud storage. The calendar information may also be accessible e.g. by accessing an electronic calendar stored on another CE device in accordance with present principles. For example, the CE device undertaking the logic of FIG. 2 may be a CE device of one family member living in a residence, and the calendar information accessed at block 100 may be from another CE device of another member of the family also living at the residence. In another example, the CE device undertaking the present logic may be e.g. a community CE device configured to engage a wall in a common area of the residence, and the calendar information that is accessed may be from plural CE devices of family members living in the residence, with the CE device consolidating all calendars of family members for presentation on the CE device undertaking the present logic.

In any case, after block 100 the logic proceeds to block 102 where the logic may access calendar information for one or more people stored locally on a computer readable storage medium of the CE device undertaking the logic of FIG. 2. Thereafter, the logic moves to block 104 where the logic accesses calendar information for one or more calendars that are provided by and/or associated with an email provider and/or platform such as e.g. Gmail, Hotmail, Yahoo, etc. The calendar information accessed at block 104 may be stored e.g. remotely with the email provider on the provider's server, but is nonetheless understood to be accessible to the CE device undertaking the present logic via e.g. the Internet (e.g. the CE device of FIG. 2 thus being configured with account access information for the email provider, it being duly noted that the CE device may be configured with account access information for accessing any of the accounts and/or calendars described herein, such as the social networking information to be described shortly). The logic then moves to block 106 where the logic accesses calendar information from one or more social networking services for one or more user accounts associated with the social networking services for which the CE device undertaking the present logic has been configured to access.

Before moving on, note for clarity that the as referenced below, the "present CE device" is understood to refer to a CE device undertaking present principles (e.g. executing the logic of FIG. 2, presenting the Ills of FIGS. 3 and 4, etc.).

Regardless, the logic then moves to block 108 where the logic accesses online invitation and/or event service information for one or more invitation/event services for which the CE device has been configured to access based on e.g. user-provided and/or user-received (e.g. via email or text message) information for e.g. electronic invitations of events. Then at block 110 the logic accesses electronic répondez s'il vows plaît (RSVP) information provided by a user e.g. responsive to an electronic invitation being provided to the user via email. From there, the logic moves to block 112 where the logic accesses text messaging information for one or more people, such as text messages sent to a smart phone accessible to the CE device that pertains to an appointment, meeting, event, etc. For instance, if a person receives an text message invitation to meet friends at the movies at least in part using a text messaging application on the recipient's smart phone, and e.g. assuming in some embodiments that the recipient has replied to the invitation in the affirmative, the present CE device may access such text messaging information and search/parse it to determine one or more pieces of information to consolidate and present on the CE device in accordance with present principles (e.g. to determine time-based information and/or events specified in the test message(s) for which the recipient has agreed to be a participant). As another example, if the user's doctor provides an appointment reminder to the user via text message to the user's smart phone, the present CE device may access the text message and parse it for information for consolidation and presentation on the CE device.

Still in reference to FIG. 2, after block 112 the logic moves to block 114 where the logic accesses electronically stored task information such as may be stored on an e.g. electronic "To Do" list, agenda, docket, etc. (e.g. using a To Do List application, note-taking application, docketing application, etc.) for information to consolidate in accordance with present principles. Such electronically-stored lists or agendas may include e.g. lists stored as word processing documents and designated as a To Do list, information entered into an agenda application or note taking application, and electronic dockets such as those for business and scheduling purposes.

After block 114 the logic proceeds to block 116 where the logic accesses history and/or current information for one or more applications to search and/or parse the history information for time-based or time-related input. For instance, a history for a sports score application may be accessed to determine a particular game score that was accessed by the user using the sports score application, and hence identify the start time of the next game for one or both of the teams from the score (e.g., the one determined to be the "home" team and/or local team based on a location with which one of the teams is associated as compared to the current GPS coordinates of the CE device being used around the "home" team's primary location) to include it in the consolidated information. Other example applications for which history and/or current information may be accessed include e.g. weather applications (for consolidating weather information for a location indicated on a user's calendar as being a location which the user will be at in the future), grocery or shopping applications (for consolidating information on current sales at the user's preferred retailers), traffic applications (for presenting traffic information), news applications, etc.

After block 116 the logic moves to block 118 where the logic accesses information provided by e.g. a state or local government such as e.g. an online database or web page of government-sponsored and/or government-sanctioned events. Similarly, at block 120 the logic accesses information provided by e.g. local entertainment entities such as e.g. a radio station's web page, a concert promoter's database, a local newspaper's events page, etc. for information to consolidate related to local events. After blocks 118 and 120, the logic moves to block 122 where it accesses web browser (e.g. history) information, channel and/or program viewing history information (e.g. stored at a set top box), call history information (e.g. stored on a smart phone), etc. for consolidating such information, and/or used to determine still other information to consolidate based thereon.

Having accessed, determined, and/or stored (e.g. in a temporary location, and/or local location relative to the present CE device) information to be consolidated, the information is then consolidated and organized e.g. per user preferences (e.g., based on whether a day or week view is to be presented, based on priorities for which information is to be presented first or more prominently as set by the user, etc.) at block 124. Thereafter, the logic presents the information in e.g. consolidated form on a user interface (UI) at block 126. An exemplary UI presenting such information will be described in reference to FIG. 3 and may sometimes be referred to herein as e.g. a "consolidated UI." Regardless, after block 126 the logic proceeds to block 128 where the logic determines whether one or more friends, family, and/or associates of the user are within a e.g. user-defined proximity (e.g. radius) to the user and/or a location where it is determined the user will be based on calendar information so that such information may also be presented on a UI in accordance with present principles. The logic then concludes at block 130 where the logic may even e.g. recommend a particular action based on the context of one or more items presented on the UI, as will be described further in reference to FIG. 3 below.

Figure 3:
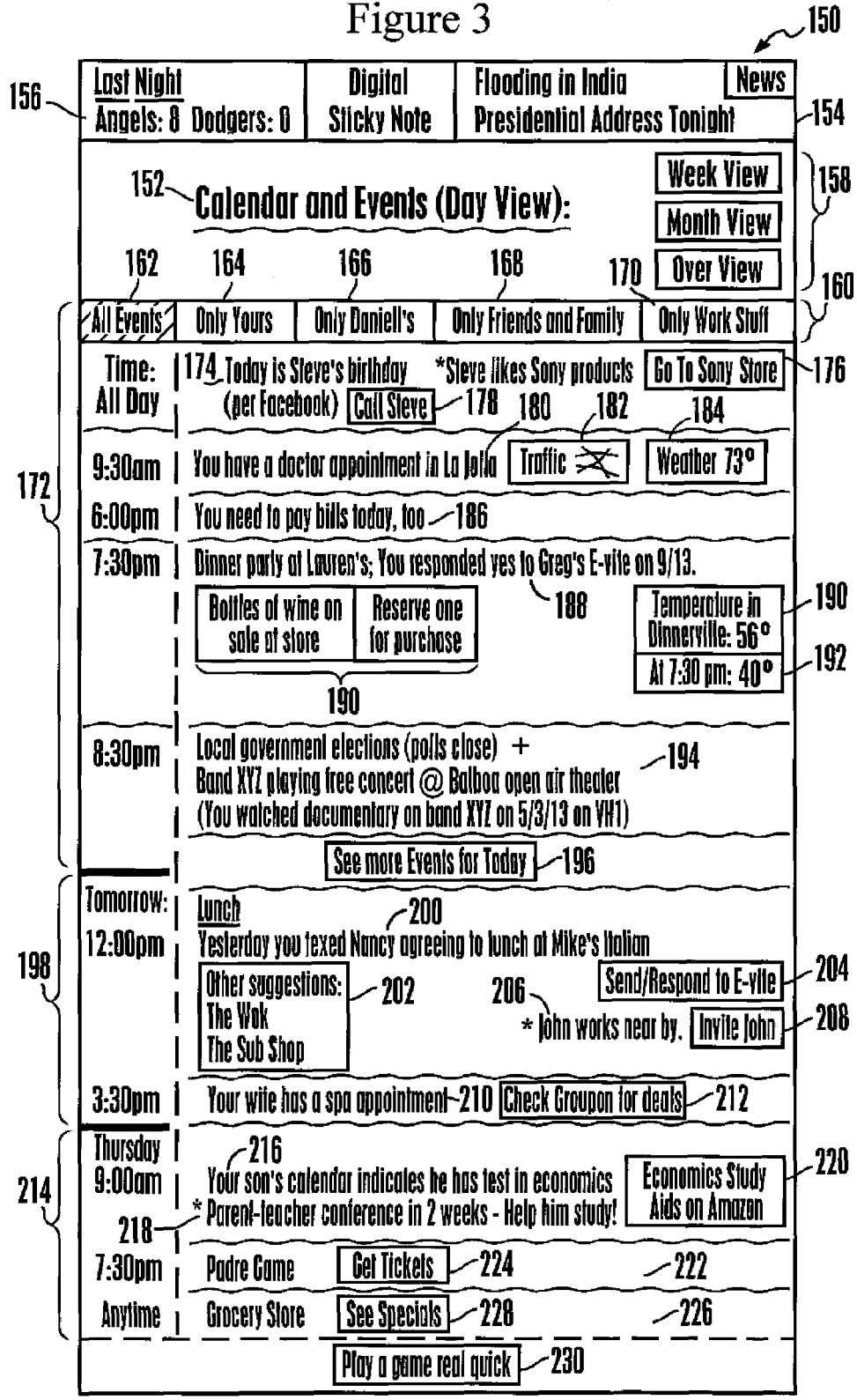
FIGS. 3 and 4 are exemplary user interfaces (UIs) presentable on a CE device in accordance with present principles.

Accordingly, reference is now made to FIG. 3, which shows an exemplary consolidated (e.g. "digital sticky note") UI 150. The UI 150 includes a title/indicator 152 that the UI 150 is directed to consolidated calendar and/or events presented as a day view format, in that the calendar entries and/or events are listed in chronological order by day, beginning e.g. with the current day. Note that the sticky note UI 150 includes information other than e.g. calendar information such as local and/or national news updates (e.g. presented in box 154) and sports scores (e.g. presented in box 156) that may have been configured e.g. responsive to user input indicating particular teams for which a user of the UI 150 wishes the UI 150 to present. In addition to the foregoing, note that although a day view is shown on the UI 150, selector elements 158 are also presented that are selectable by a user to automatically without further user input responsive thereto present e.g. a week view for a listing of calendar information and/or events by week, a month view for a listing of calendar information and/or events by month, and/or an "other" view for a listing of calendar information and/or events in another e.g. user-defined format.

In any case, yet another feature for sorting calendar and/or event information in accordance with present principles is shown on the UI 150, specifically a bar 160 of selector elements selectable by a user to automatically without further user input responsive thereto present events and/or calendar information for only a certain user and/or class of user. It is to thus be understood that the selector elements shown in the bar 160 may be configured by a user to e.g. correspond to a particular person or class of people for which information will be presented on the UI 150.

As may be appreciated from FIG. 3, there is a first selector element 162 selectable to cause the UI 150 to present all events and/or calendar information for which it has been configured to access (e.g. all classes of people and/or specific people). Note that the element 162 is shaded to denote that the configuration associated therewith is the currently-selected configuration. The bar 160 also includes a second selector element 164 selectable to cause the UI 150 to present (e.g. only) events and/or calendar information for the (e.g. primary and/or designated) user of the UI 150, a third selector element 166 selectable to cause the UI 150 to present (e.g. only) events and/or calendar information for a designated person named Danielle, a fourth selector element 168 selectable to cause the UI 150 to present (e.g. only) events and/or calendar information for a designated class of people "family and friends" (e.g., the class may have been determined using a settings UI to add particular people to the class, and/or may be automatically determined by the CE device presenting the UI 150 based on e.g. familial relationship connections determined based on or indicated in a social networking account and/or profile of the user that indicates whom is related to the user), and a fifth selector element 170 selectable to cause the UI 150 to present (e.g. only) events related to the user's job (e.g., only events from a work-related calendar, business-related calendar, work-related email account, etc. as determined based on e.g. user input).

Beneath the bar 160 is a detailed listing of events by day arranged in chronological order, though it is to be understood that a user may e.g. configure the UI 150 to present such information in reverse-chronological order, if desired. In any case, the UI 150 includes a section 172 listing events for the current day. The section 172 includes a first entry 174 designated as being an all day event, and was derived e.g. from information on a social networking service. As may be appreciated from FIG. 3, the event is a birthday for a person named Steve, as derived from information associated with the user's Facebook account where Steve is a friend of the user.

The entry 172 also notes that Steve likes Sony Electronics products (e.g. as may have been determined by the CE device presenting the UI 150 responsive to accessing Steve's information such as e.g. Steve's social networking profile(s) indicating Steve likes Sony Electronics products, Steve's web browser history in which he viewed Sony Electronics products, based on Steve's ownership and/or use of Sony Electronics devices, etc.). In the example shown, since it has been determined that Steve likes Sony Electronics products and that a gift may be an appropriate recommendation since it is Steve's birthday (e.g. as determined responsive to accessing a database correlating events with particular recommendations/actions and/or classes of recommendations/actions such as correlating a birthday event with recommending gift purchases and/or contacting the person to wish them a happy birthday), the CE device presenting the UI 150 may also present a selector element 176 that is selectable to automatically without further user input cause an electronic Sony Electronics store (e.g. purchasing application) to be presented on the CE device for e.g. purchasing a Sony Electronics birthday present for Steve. Note further that another selector element 178 is presented for the entry 174 that is selectable to automatically without further user input e.g. cause the CE device presenting the UI 150 and/or another CE device such as a smart phone determined to be in proximity to the user when selecting the element 178 to call a telephone number (e.g. from an electronic contact list on the smart phone and/or present CE device) associated with Steve so that e.g. the user can wish Steve a happy birthday over the phone.

The section 172 also includes a second entry 180 designated to occur at nine thirty a.m. The event as reflected on the UI 150 pertains to a doctor appointment for which the user is scheduled as e.g. derived from one of more calendars associated with the user which the present CE device has access to extract information therefrom. Note that the entry 180 includes an indication 182 of traffic (e.g. a traffic road map of red and green areas denoting traffic congestion and no traffic, respectively), as well as an indication 184 of the weather at or around the location of the doctor's office (e.g. as derived from a weather application accessible to the present CE device). A third entry 186 is also shown on the section 172, the entry 186 noting that the user should pay bills today, as may have been derived from e.g. a task list or document accessible to the present CE device which indicated that bills need to be paid and that they should be paid today by e.g. six p.m.

Yet another entry 188 is shown pertaining to an event scheduled for seven thirty p.m., which indicates based on calendar information from one or more calendars that the user is scheduled to attend a dinner party tonight. Note that the entry 188 also indicates that the user responded in the affirmative to another person's (e.g. Greg's) E-vite on September thirteenth. Thus, it may be appreciated that the entry 188 includes consolidated information from one or more calendars for which the user has entered the event as well as information e.g. from an email account of the user which was searched for E-vites to identify the information represented on the entry 188. In addition to the foregoing, note that the entry 188 includes a selector element 190 indicating that bottles of wine are on sale at the local grocery store (e.g. as presented responsive to accessing a database correlating dinner party events with items that may be appropriate for such occasions, including bottles of wine). In some embodiments, at least one portion of the element 190 may be selectable to automatically without further user input cause the CE device to do one or both of e.g. automatically reserving a bottle of wine at the store by providing a message to the store's computer system, and/or launching an online purchasing application to purchase and/or reserve a bottle of wine from the present CE device. Still describing the entry 188, it also includes an indication 190 of the temperature where the dinner part is to occur (e.g. the town of Dinnerville) as well as the projected temperature at the time the dinner party is to begin (e.g. seven thirty p.m.).

The final exemplary entry for section 172 shown on the UI 150 is an entry 194 indicating events occurring locally (e.g. within a predefined radius as input by a user to the present CE device) relative to the present CE device. Thus, at eight thirty p.m. the polls close for local government elections (e.g. as derived from a government database and/or website accessed by the present CE device). Also at eight thirty p.m. the band named XYZ is scheduled to play a free concert at a local location (e.g. as derived from a local events website). Note also that beneath the indication that band XYZ is playing is an indication that the user watched a documentary on band XYZ on May 3, 2013 on the channel VH1. Thus, it may be appreciated that e.g. the present CE device accessed a local events website and determined that the event for which band XYZ is to play a local concert may be of interest to the user based on a correlation of information on the local events website regarding band XYZ with information from the user's channel and/or program viewing history stored e.g. on a set top box accessible to the present CE device indicating that the user has previously viewed a program for which band XYZ was "tagged" as being a subject thereof.

In addition to the foregoing, note that the section 172 also includes a selector element 196 beneath the entry 194. The selector element 196 is selectable to automatically without further user input cause more events for the current day to be presented if e.g. more events were consolidated based on accessed calendars but not initially provided on the UI 150 (e.g. if the user had configured settings for the UI 150 to initially present no more than five entries for any given day, and e.g. even configuring the settings to present the most important, most relevant, or prioritized five events as will be discussed further below in reference to FIG. 4).

Still in reference to FIG. 3, beneath the section 172 is another section 198 providing events scheduled to take place the day after the current day (i.e. "tomorrow," as indicated). The section 198 includes a first entry 200 to occur at noon the day after the current day. The entry 200 indicates (e.g. based on calendar information from one or more calendars that have been accessed by the present CE device and/or a text messaging application accessed by the present CE device) that the user texted a person named Nancy agreeing to meet Nancy for lunch at an Italian restaurant at noon tomorrow. The entry 200 also includes a box 202 of alternative restaurants to the agreed-upon Italian restaurant that are each selectable to e.g. cause a text message to automatically without further user input be sent to Nancy's smart phone suggesting the alternative, to cause a web page and/or menu for the selected alternative to be presented, and/or to contact the alternative restaurant over the telephone, etc. Note that the alternatives may have been determined for presentation on the UI 150 based on e.g. GPS data from a GPS receiver on the user's smart phone indicating that the user has previously been to the alternative, based on the alternatives being proximate the Italian restaurant (e.g. within a predefined radius as set by a user and/or the present CE device itself), based on the alternatives having one or more tables available at the agreed-upon time as indicated in a reservations system and/or calendar associated with the respective alternative(s) that is accessible to the present CE device, etc.

In addition to the foregoing, the entry 200 also includes a selector element 204 that is selectable to e.g. automatically without further user input generate and send, and/or respond to, an electronic invitation for the event to which the entry 200 pertains (e.g. the element 204 may be presented for selection to cause an RSVP to be provided to Nancy responsive to determining that an electronic invitation from Nancy has not yet been responded to based email account information for an email account associated with the user of the present CE device). The entry 200 also includes an indication 206 that the user's friend John works close (e.g. within a predefined radius) to the Italian restaurant where the user will be having lunch, and thus is accompanied by a selector element 208 selectable to e.g. automatically without further user input cause an (e.g. automatically generated) text message, email, other notification to be sent to John, and/or call to be placed to John, to invite John to lunch with the user and Nancy.

In addition to the foregoing, the section 198 also includes a second entry 210 indicating that the wife of the user has an spa appointment scheduled for three thirty p.m. tomorrow, along with a selector element 212 selectable to e.g. automatically without further user input to cause e.g. an online coupon provider application (e.g. such as Groupon) to be searched for spa coupons (e.g. particularly directed to the spa which the wife will be going to) and/or to simply launch a web browser to present a website associated with the online coupon provider. Note that the present CE device may have determined that on online coupon provider application may be an appropriate feature to recommend based on e.g. accessing a database correlating certain types of activities such as spa treatments with often having coupons offered for such activities to thereby determine that an online coupon provider is a relevant suggestion to include with the entry 210.

Still in reference to FIG. 3, beneath the section 198 is yet another section 214 providing events scheduled to take place two days from the current day (e.g. Thursday as indicated). The section 214 includes a first entry 216 for an event to occur at nine a.m. on Thursday, which e.g. is that the son of the user has a test in his economics class (e.g. as determined responsive to the present CE device accessing an electronic calendar associated with and/or controlled by the son). The entry 216 includes an indication 218 that the user has a parent-teacher conference regarding the son scheduled for approximately two weeks from Thursday (e.g. based on accessing an electronic calendar of the user and correlating the parent teacher conference entry on the user's calendar pertaining to the son with the son's test in economics entry on the son's calendar using metadata and/or tags such as "performance," "grades," "school," and/or "son" etc. that are mutually present for each). Based on e.g. similar kinds of correlations, a selector element 220 may be presented that is selectable e.g. automatically without further user input to cause an online book store pertaining to economics to be presented on the CE device for purchasing of a study aid in the topic of economics.

The section 214 also includes a second entry 222 for seven thirty p.m. on Thursday for a sporting event which the user has entered into one or more of the user's electronic calendars. The entry 222 also includes e.g. responsive to determining that the entry 222 pertains to a local sporting event, a tickets selector element 224 selectable to e.g. automatically without further user input launch an electronic ticket store to purchase tickets to the game.

Beneath the entry 222 is yet another entry 226 for Thursday that is designated as something that should or may occur at an unspecified time but nonetheless still on Thursday (e.g., "anytime" as shown in FIG. 3). In the present instance, the action/task to occur is to go to the grocery store. The present CE device may also present a selector element 228 with the entry 226 that is selectable e.g. automatically without further user input to cause an electronic store and/or application to be presented that is associated with the most-proximate grocery store to the present CE device and/or the store gone to most often by the user based on e.g. GPS history data from the user's smart phone that is accessible to the present CE device.

Concluding the description of FIG. 3, beneath the section 214 is a selector element 230 selectable to e.g. launch a gaming feature on the present CE device. Thus, for instance, if the user approaches the present CE device, looks at the upcoming events shown thereon, and then wishes to briefly play an electronic game on and/or accessible to the present CE device such as solitaire, the selector element 230 may be selected to e.g. automatically without further user input responsive thereto present plural game options and/or automatically launch a most-frequently selected game.

Figure 4:
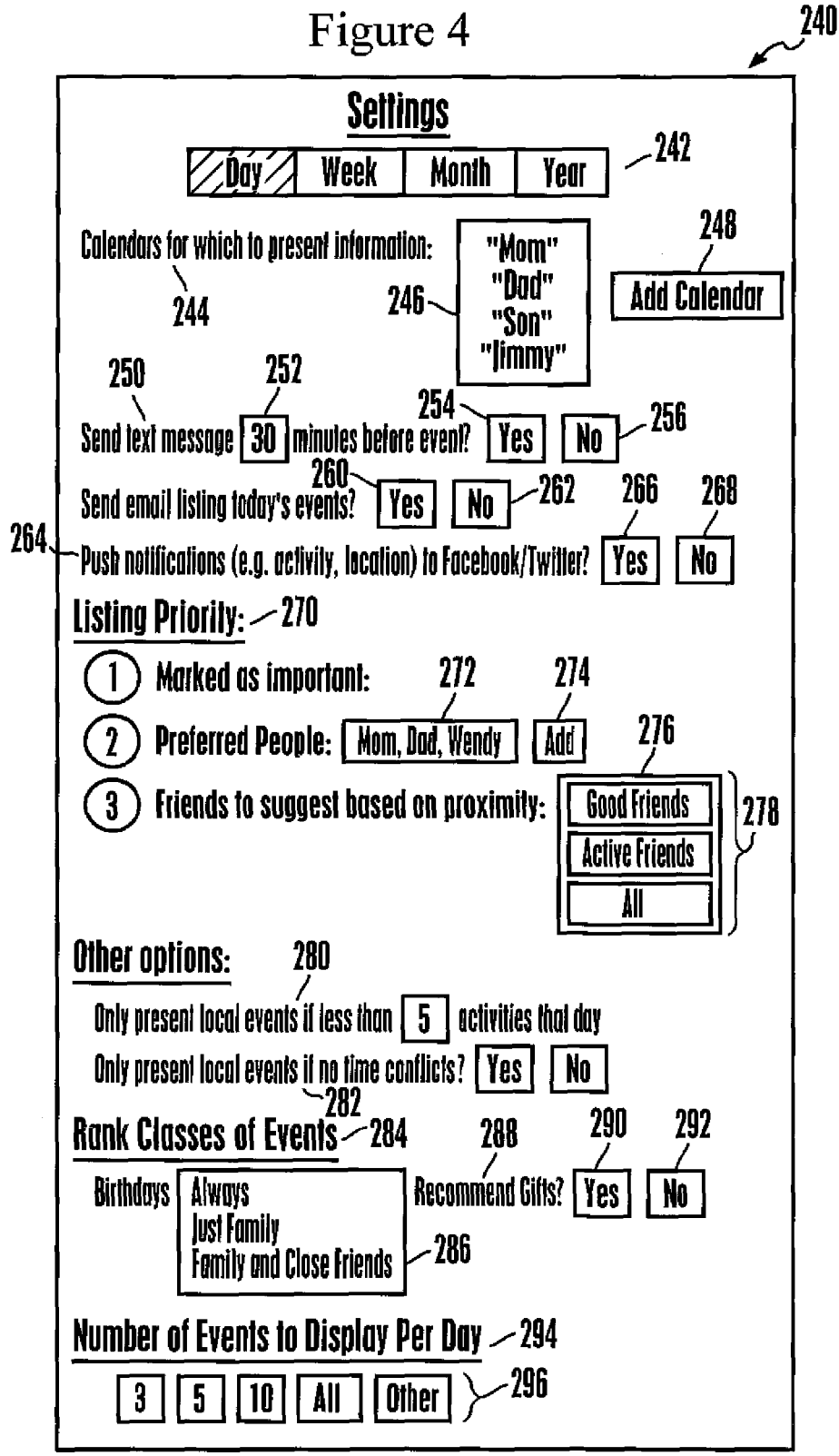

Moving on in the detailed description now in reference to FIG. 4, an exemplary settings UI 240 is shown that is presentable on a CE device in accordance with present principles for configuring options for a consolidated "sticky note" UI such as e.g. the UI 150 described above. The settings UI 240 thus includes a first setting 242 for configuring the CE device to present information in day, week, month, or year format. Note that the box for "day" is shaded to denote that the currently-selected configuration for setting 242 is to present a consolidated UI in day format. The settings UI 240 also includes a second setting 244 for selecting one or more electronically-stored calendars for e.g. different users that are to be accessible to and/or accessible by the CE device to e.g. extract and consolidate information therefrom in accordance with present principles. Thus, the setting 244 includes a box 246 indicating plural calendar names associated with respective calendars for which the CE device has been configured to access and extract information therefrom. The setting 244 also includes a selector element 248 selectable to e.g. automatically without further user input cause a browser box to be presented on the CE device which is manipulable by the user to locate another calendar accessible to the CE device for which to have added to the box 246 and hence for which to configure the CE device access, extract information from, and consolidate such information into a UI such as the UI 150. Note that when adding a calendar in accordance with present principles, e.g. login or access information for the calendar(s) may be input by the user of the present CE device responsive to a prompt for such information to thus provide the CE device with information that may be required to access the calendar(s).

In addition to the foregoing, the UI 240 also includes a third setting 250 manipulable via e.g. box 252 for number entry to, if desired, cause a reminder message to be sent via text message (and/or, e.g., another messaging means such as email, social networking message, etc.) a number of minutes and/or hours before the event is to occur based on the number input to the box 252. A yes selector element 254 and a no selector element 256 are also shown for activating or deactivating, respectively, the reminder feature for the setting 250.

Yet another setting 258 is shown that can be activated using the yes selector element 260 or deactivated using the no selector element 262 for e.g. automatically sending an email or other electronic notification providing all the day's events (e.g. that would be and/or as are provided on a "sticky note" UI such as the UI 150 described above) in e.g. email form to an email account associated with the user e.g. at the beginning of the day and/or at a time defined by the user. Similarly, a setting 264 that can be activated using the yes selector element 266 or deactivated using the no selector element 268 is shown for e.g. automatically pushing similar notifications of the clay's events to another account associated with the user such as a social networking account.

Still in reference to FIG. 4, the UI 240 also shows a user-manipulable priority setting 270 for establishing a priority of information to be consolidated onto a single, consolidated UI in accordance with present principles. Thus, the priority as shown is to first and/or more prominently present events and/or items designated as important e.g. at the source calendar that has been accessed and/or at the consolidated UI. The next item for which priority has been established, albeit a lower priority than events designated as important, are items and/or events pertaining to particular people listed in the box 272, where the box 272 is configured for editing (e.g. adding and deleting people) responsive to selection of the selector element 274. Note that another category weighted as third in priority pertains to suggestions that are to be made by the CE device, and in the present instance pertains to friends which may be suggested to contact to join an activity if proximate thereto. Thus, a box 276 with plural selector elements 278 each respectively selectable to select a different class of people that may be suggested on a consolidated UI is shown. As examples, classes of people that may be suggested (e.g. based on the user arranging particular people in that class, based on people being determined to be in a particular class based on social networking profile information, etc.) include good friends of the user, all friends that are active online (e.g. within a predefined period of time at a social networking account for the friend), and all friends.

Still other settings may be configured using the UI 240. For example, there may be settings for only presenting certain events on a consolidated UI if less than a user-determined number of events have already been included on a consolidated UI for a particular day, such as only presenting local events for which information from a local event website has been consolidated if less than e.g. five other events to be presented on a consolidated UI also exist for the day of the local event (shown as setting 280). In addition to the foregoing, an exemplary setting 282 is shown that is configurable to only present e.g. events other than from electronically-stored calendars designated by the user if there are no time conflicts between events from the calendar(s) and the other events, such as e.g. a local entertainment event. What is meant by no conflicts is e.g. that the two events do not begin at the same time, are not scheduled to have durations which overlap at least one time period (e.g. one minute), and/or that are determined to both be events at different times that are possible for the user to attend even if at different locations given projected traffic conditions, the distance and travel time therebetween, etc.

Another exemplary feature of the settings UI 240 that is shown is a ranking/priority setting 284 for a particular class of events. In the example shown, birthday is the class of events, and box 286 includes plural user-selectable options for birthdays that are to be presented on a consolidated UI at the user's preference, such as e.g. all birthdays, only birthdays of family members of the user, and birthdays of family and close friends of the user. There is also a setting 288 for configuring the CE device to suggest gifts and/or retail stores when birthday entries are provided based on selection of a yes selector element 290, or not presented based on selection of a no selector element 292.

The UI 240 also shows a setting 294 along with plural selector elements 296 for selecting the total (e.g. maximum or minimum) number of events per day, week, month, and/or year to present on a consolidated UI such as e.g. presenting three events, five events, ten events, or another user-determined number of events per day.

Though not shown in FIG. 4, it is to be understood that still other settings may be included for configuration by a user. For instance, for views based on any one format such as e.g. day, week, month, and/or year, the CE device may be configured to only present certain types of information depending on the format (e.g. to not present local events on the month view but always present events from the user's calendar and the user's wife's calendar). As another example, items from a user's to do list and/or having to do with the user's health may be ranked higher than events derived from sources associated with other people. As yet another example, events for which the user has responded in the affirmative to an electronic invitation may be configured to always be presented on a consolidated UI. Still other settings may be configured, such as presenting all items for e.g. a particular day in a group depending on the source of the items such that e.g. all items from a user's calendar for a particular day are presented first, and then all items from the user's wife's calendar are presented beneath that for the same day, and only presenting events from a friend's calendar if e.g. it is determined that a predetermined threshold number of people (e.g. friends of the user as determined based on the user's social networking friends) will be attending the event.

Without reference to any particular figure, it may now be appreciated that a consolidated UI presented on a CE device may essentially act as a digital "sticky note" of information. Such a CE device may be placed in a central location within a home such as e.g. on a refrigerator, on a wall of a hallway, etc., and may thus be configured with engagement members on a back portion of the CE device such as e.g. magnets for adhering to a metallic surface or hooks for being hung from a wall. In any case, such an electronic sticky note may thus be used as a tool for aggregating calendar items, reminders, events, activities, and appointments to provide them to a user in an intuitive, flexible way while also providing recommendations relating to the items. This provides a very convenient way to view events by e.g. day, week, month, etc. and then receive recommendations based on one or more of the user's profiles and/or other people's profiles (e.g. social networking) to e.g. save a user time while also reminding a user not to forget something (e.g. like shopping for a birthday present).

Furthermore, note that although present principles are described as generating consolidated UIs at CE devices, it is to be understood that the calendar(s), services, websites, etc. described herein may be accessed by a server as well, where the server may generate the consolidated information and push it to one or more CE devices (e.g. using a cloud-based environment).

Describing events that may be suggested to a user and presented on a consolidated UI in accordance with present principles, it is to be understood that events to present on such a UI may be determined e.g. based on what events and/or topics are generally trending on one or more particular social networking services, and/or what events and/or topics are particularly trending from the user's friends. For instance, if there is a trending event that the user's friends all wish to have dinner together in a particular city in the near future, a consolidated UI may include a recommended restaurant which the user can suggest as the location for the dinner.

As an example of another source of information from which information may be derived for presentation on a consolidated UI, if there is a physical, non-electronic (e.g. paper-based) calendar within the image gathering distance of a CE device's camera, the CE device may scan the area for a calendar and hence recognize it as a calendar, gather an image thereof, and e.g. extract information therefrom using e.g. a conversion application to thus determine events that e.g. a user may have written on a calendar but forgot to enter into an electronic calendar.

Describing the use of facial recognition in accordance with present principles, note that a "sticky note" UI in accordance with present principles may e.g. dynamically changed based on the viewer. Thus, for instance, should two users configure their own respective sticky note UIs differently, when one of the users is within range of the CE device's camera, the CE device may gather an image of the person and determine which particular sticky note UI should be presented based on facial recognition of the user using facial recognition technology.

Describing the consolidating of calendar information from different calendars, note that should e.g. the same event be noted in plural calendars but with slight variations, rather than presenting information for both events and/or presenting the information as if the two were separate events, the CE device may present only a single entry for the event based on a determination that although the information in the respective calendars is not the same, the entries nonetheless pertain to the same event and may thus be synthesized into a single entry for the consolidated UI. This may be done by e.g. searching both entries and determining that a certain number of (e.g. key) words are included in each. For instance, if both entries were to include the words "lunch" and "Nancy," it may be determined by the CE device that the events separately noted in different calendars nonetheless pertain to the same actual event, and hence the CE device may present "lunch with Nancy" as a single event on a sticky note UI as described above in reference to FIG. 3.

Further describing the week, month, and year formats/views discussed above, note that such consolidated UIs may be configured to present one or more of the selector elements, settings, etc. described above in reference to the day format of FIG. 3. Also note that lower level UIs are understood to be presentable in accordance with present principles responsive to selection of e.g. a corresponding selector element from a consolidated UI such as the UI 150. For example, the send/respond to E-vite selector element 204 may be selectable to cause a lower level UI to be presented for inputting a response to such an invitation.

Accordingly, as may be appreciated from the present disclosure, content may be pushed to a user on a digital sticky note. The sticky note thus acts as a content aggregator and a device to which information may be pushed. Thus, when a person walks up to the device before even touching anything, valuable, personal (e.g. user-specific), and/or real-time information may be made readily available for viewing. Form this initial presentation of information, the user may then you can dive down deeper into the information for even more specific information.

As a first example, life events such as birthdays, anniversaries, holidays, graduations, promotions, new job information, new house information, new-born baby information, appointments, etc. may all be initially presented to a user when the user approaches the device. This information is understood to be e.g. pushed to the device and/or pulled by the device from multiple sources, and thus the information may notify the person observing the device within e.g. a predetermined time frame. Then, if the user wants to know when events happen a month in advance, that's when they can will get the information by e.g. drilling down deeper into what as already been presented. The same can be said for e.g. week views and day views, all of which may be customized by the user.

As a second example, this time regarding restaurants, information may be pulled using e.g. GPS, a location radius for the device and/or restaurant, and/or tied to a Yelp page and other restaurant review sites. If the user is feeling like eating Chinese food on a given night, the user may e.g. touch a food type selector element initially presented on the device and view restaurants of that type (e.g. Chinese) via automatically population of e.g. local Chinese restaurants to the user interface. As another example, suppose it's Cinco De Mayo. The device may automatically without user input recommend that the user go out for Mexican cuisine that day based on a determination that the fifth of May is a Mexican holiday, and also include Mexican restaurant recommendations.

As yet another example, this time regarding local events, information regarding events such as e.g. concerts, plays, Broadway shows, art festivals, music festivals, movies, attractions, etc. may be aggregated by a Digital Sticky Note based on e.g. locally-based websites, event-based applications (e.g. "apps"). Such information and/or activities may be pushed to the device per one or more determinations that the events, concerts, shows, etc. align with the user's interests (e.g. based on social networking information accessed by the Digital Sticky Note). A user may then view a week, month and year perspective for this class of events and others to thus to see what is going on within the user's area.

For clarity, in example embodiments the term "accessing" as used herein may be understood to mean accessing the e.g. calendar, parsing it for information in accordance with present principles, and/or extracting the information therefrom. Note further that artificial intelligence principles and/or software may also be used when accessing information and making determinations in accordance with present principles.

While the particular DIGITAL STICKY NOTE is herein shown and described in detail, it is to be understood that the subject matter which is encompassed by the present invention is limited only by the claims.

What is claimed is:

1. An apparatus, comprising:
at least one computer memory that is not a transitory signal and that comprises instructions executable by at least one processor for:
accessing one or more electronically stored calendars of events pertaining to at least one user to obtain first calendar information from the one or more electronically stored calendars;
accessing at least second calendar information;
consolidating the first and second calendar information to render consolidated information;
presenting at least some of the consolidated information on a user device associated with the user;
facilitating first user input to cause presentation of calendar information for all classes users and/or all specific people in the consolidated information;
facilitating second user input to cause presentation of calendar information for only a single person in the consolidated information;
facilitating third user input to cause presentation of calendar information for only a designated class of people in the consolidated information;
presenting a listing of events in the consolidated information in chronological order and/or in reverse-chronological order; and
facilitating fourth user input to cause presentation of more events not initially provided on display;
facilitating user input to cause a reminder message of at least one event in the consolidated information to be sent before the event is to occur;
facilitating user input to send an electronic notification of at least one event in the consolidated information.

2. The apparatus of claim 1, wherein the instructions are executable for:
facilitating the user viewing the at least some of the consolidated information on the user device by week or month at the user's option.

3. The apparatus of claim 1, wherein the second calendar information is from a social networking site.

4. The apparatus of claim 1, wherein the instructions are executable for:
accessing at least one email account of the user to obtain third calendar information from the site; and
consolidating the third calendar information with the first and second calendar information to render the consolidated information.

5. The apparatus of claim 1, wherein the instructions are executable for:
arranging the consolidated information chronologically.

6. The apparatus of claim 1, wherein the instructions are executable for:
accessing personal information associated with a subject of the event; and
based on the personal information, rendering the recommendation.

7. The apparatus of claim 1, wherein the instructions are executable for:
automatically recommending a restaurant responsive to a determination that the event is a dinner and attendees associated with the event other than the user are located near the restaurant.

8. The apparatus of claim 1, wherein the instructions are executable for:
presenting a first selector selectable to cause a reminder message of at least one event in the consolidated information to be sent at a designated time before the event is to occur;
presenting a second selector selectable to send an electronic notification of plural events in the consolidated information occurring within a predetermined period of time.

9. A method, comprising:
accessing one or more electronically stored calendars of events pertaining to at least one user to obtain first calendar information from the one or more electronically stored calendars;
accessing at least second calendar information;
consolidating the first and second calendar information to render consolidated information;
presenting at least some of the consolidated information on a user device associated with the user;
facilitating first user input to cause presentation of calendar information for all classes users and/or all specific people in the consolidated information;
facilitating second user input to cause presentation of calendar information for only a single person in the consolidated information;
facilitating third user input to cause presentation of calendar information for only a designated class of people in the consolidated information;

presenting a listing of events in the consolidated information in chronological order and/or in reverse -chronological order; and facilitating fourth user input to cause presentation of more events not initially provided on display;

facilitating user input to cause a reminder message of at least one event in the consolidated information to be sent before the event is to occur;

facilitating user input to send an electronic notification of at least one event in the consolidated information.

10. The method of claim 9, comprising automatically presenting a recommendation pertaining to at least one event in the calendar information based at least in part on a person's profile, wherein plural sources for the calendar information include an electronic calendar, an email account of the user, and a social networking site of the user, wherein the person's profile is the user's profile.

11. The method of claim 9, comprising automatically presenting a recommendation pertaining to at least one event in the calendar information based at least in part on a person's profile, wherein plural sources for the calendar information include an electronic calendar, an email account of the user, and a social networking site of the user, wherein the person's profile is a profile of a person other than the user and associated with the event.

12. The method of claim 9, wherein at least one source for the calendar information is an electronic calendar.

13. The method of claim 9, wherein at least one source for the calendar information is an email account of the user.

14. The method of claim 9, wherein at least one source for the calendar information is a social networking site of the user.

15. A computer system, comprising:
at least one processor; and
at least one computer readable medium accessible to the processor and comprising instructions executable by the processor for:

accessing stored calendar information of a user and/or calendar information related to an email application of the user, and accessing social network information of the user to render consolidated calendar information;

presenting on a display at least one user interface (UI), the UI facilitating at least:

user input to cause presentation on the display of all of the consolidated calendar information, user input to cause presentation on the display of consolidated calendar information only for a single user, user input to cause presentation on the display of consolidated calendar information only for a designated class of people;

user input to cause presentation of consolidated calendar information relating only to a user's job;

accessing profile information of at least one person associated with the consolidated calendar information, wherein the profile information of a person other than the user.

16. The system of claim 15, wherein the instructions are executable for accessing profile information of at least one person associated with the calendar information, wherein the profile information is the user's profile information.

17. The system of claim 15, wherein the instructions when executed by the processor further configure the processor for:

accessing at least one email account of the user to obtain the calendar information related to an email application of the user; and consolidating the calendar information related to an email application of the user with the first and second calendar information to render the consolidated information.

* * * * *